Oct. 24, 1961 P. SAMMARCO 3,005,301
CONTOUR MOWER
Filed June 22, 1959
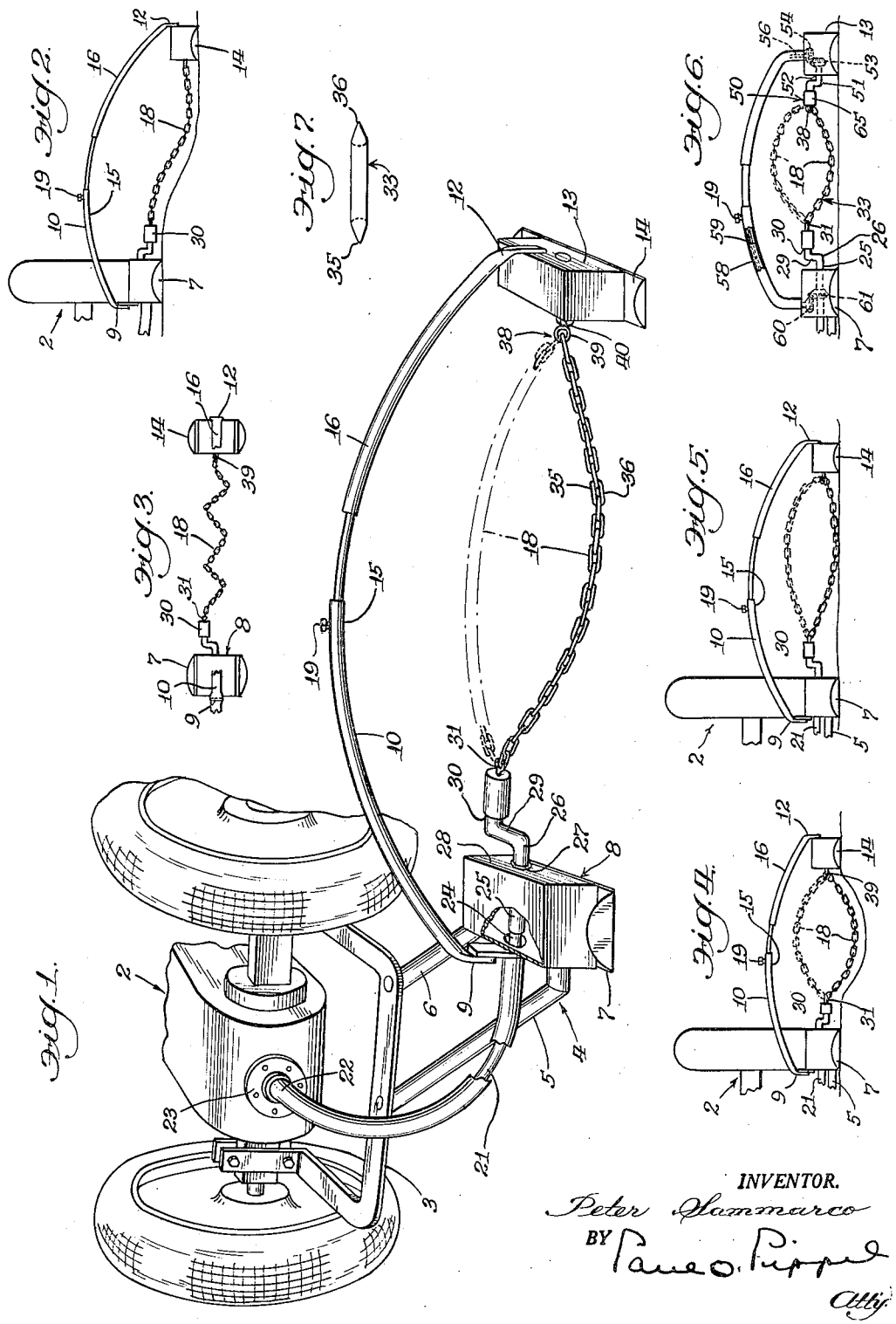
INVENTOR.
Peter Sammarco
BY
Atty

3,005,301
CONTOUR MOWER

Peter Sammarco, Bellwood, Ill., assignor to International Harvester Company, Chicago, Ill., a corporation of New Jersey
Filed June 22, 1959, Ser. No. 822,033
5 Claims. (Cl. 56—25)

This invention relates to mowers and more specifically to a novel mower which is adapted to follow undulating terrain.

A general object of the invention is to provide a mower with a flexible cutting unit such that the unit will follow different terrain conditions and which is particularly adapted for mowing uneven ground.

A further object of the invention is to provide a novel mower which comprises as a cutting unit a chain which is suspended between two points and rotated, much in the way of a little girl skipping rope, to obtain a cutting pattern.

A further object of the invention is to provide a novel mower wherein the cutting element is in the nature of a flexible linkage either a chain or a cable or the like which is rotated at a high rate of speed and adapted through impact to sever the crops.

These and other objects of the invention will become more apparent from the specification and drawings wherein:

FIGURE 1 is a perspective view of my novel mower shown in association with a tractor fragmentarily shown;

FIGURE 2 is a fragmentary rear view of the structure shown in FIGURE 1 on a reduced scale showing cutting uneven terrain;

FIGURE 3 is a fragmentary plan view of portions broken away in order to more clearly illustrate the invention;

FIGURE 4 is a rear elevational view illustrating the invention cutting a different contour;

FIGURE 5 is a rear elevational view of the structure shown in FIGURE 1 showing the mower operating on still different contour;

FIGURE 6 is a rear elevational view partially in vertical section showing the novel mower wherein both ends of the mowing element are driven; and FIGURE 7 is an end view of one of the chain links enlarged.

Describing the invention in detail and having particular reference to FIGURES 1 through 5 there is fragmentarily shown a conventional tractor generally designated 2 having an appropriate drawbar 3 to which is mounted a mower frame 4 having beam elements 5 and 6 which are suitably connected to an inner shoe structure 7. The inner shoe structure may be formed or provided with a gear box or transmission supporting unit 8. This unit, which may constitute part of the inner shoe, is connected to the inner end 9 of a reach 10 which at its other end 12 may be connected to an upstanding block or bearing structure or support 13 of an outer shoe 14. It will be seen that the reach structure 10 may be formed of telescoping inner and outer members 15 and 16 which may be lengthened or shortened depending on the swing that is desired of the associated cutting mechanism 18. The inner and outer members 15 and 16 may be interlocked by means of a set screw or any other adjusting means 19 for holding the spacing of the inner and outer shoes at desired distance. The instant invention contemplates the provision of a drive which may be of any desired form but for purposes of illustration is shown as comprising a flexible cable 21 which at its input end 22 is connected to the power take-off 23 of the tractor and at its output end is suitably splined as at 24 and connected to the input end 25 of a crank, the end 25 being part of the shaft portion 26 which is mounted in the bearing 27 in an upright wall 28 of the support 8 and projects outwardly therefrom and is connected to an arm 29. The arm 29 is connected at its outward end to a throw 30 which may be provided with an eye or any other suitable revolving mounting 31 which is connected to one end 32 of the mowing or cutting means 18. As shown in the instant disclosure the mowing means may be in the form of a chain although, of course, it will be understood that it could be wire or cable or the like as long as it has properties for cutting. A loop chain which may be sharpened along opposite edges 35 and 36 of each loop 33 is preferred so as to perform a cutting instead of a shredding function. The outer end of the mowing element 18 in the present embodiment is connected as at 38 to a stationary eye 39 which mounts in on a bracket 40 which is connected to the support 13. It will be appreciated that by varying the length of the reach structure that the arc of swing of the mowing element will be varied and that of course the mowing element being flexible it will conform to different contours as shown in FIGURES 2, 4 and 5. It will also be noted that the mowing element will at times assume the configuration shown in FIGURE 3 in that the pattern will be developed as the mowing element is cutting different densities of material or media as the unit is being advanced across the field in the manner of a conventional mower wherein the tractor holds the mower and the mowing element is disposed transversely to the line of advance as in the present instance.

Referring now to the embodiment shown in FIGURE 6 all of the parts which are identical with those in the preceding embodiment are identified by the same reference numeral. In the present instance it will be seen that the mower is provided with an outer crank 50 which may have its input shaft 51 journalled as at 52 in the support 13 and is provided with a bevel gear 53 which mates with a bevel gear 54 on the output end of a flexible shaft 56 which may extend through the hollow reach structure 10. For adjustability, the shaft 56 may be provided with suitable telescoping splined portions 58 and 59 so that as the reach may be widened or shortened without disconnecting the drive to crank 50. The input end of the flexible shaft assembly 56 is provided with a bevel gear 60 which mates with a bevel gear 61 on the output end of the flexible shaft structure 56. The gear 61 is mounted on and connected to the shaft portion 25 of the crank structure 26. It will be seen that the throw portion 65 of crank 50 is provided with an eye or any other connecting means for connecting the end 38 of the mowing or chain element 18.

The drive of cranks 50 and 26 in the embodiment of FIGURE 6 may be different from each other by providing different size bevels or may be the same to obtain different swings of chain as may best suit the particular condition in which the mower is operating.

Thus it will be seen that a novel and effective mower has been provided which is adapted for cutting vegetation or uneven terrain which cannot be accomplished by conventional mowers.

What is claimed is:

1. A mower comprising a mobile frame having spaced supports thereon, a flexible mowing element having opposite ends, one end of said element being secured to one of said supports, an eccentric drive means associated with the other of said supports, and the second end of said mowing element being attached to said eccentric drive means, whereby when said eccentric drive means is rotated said mowing element will be swung in an arc to cause mowing action.

2. The invention according to claim 1 and eccentric drive means between said one end of the mowing element and said one of the supports.

3. The invention according to claim 2 and means driving both of said eccentric drive means at different relative speeds.

4. The invention according to claim 1 and said frame comprising a pair of parts adjustably interconnected longitudinally of the mowing element.

5. The invention according to claim 1 and eccentric drive means between said one end of the mowing element and said one of the supports and a flexible drive connection between both of said eccentric drive means.

References Cited in the file of this patent

UNITED STATES PATENTS

| | | |
|---|---|---|
| 448,230 | Guichard | Mar. 17, 1891 |
| 1,893,173 | Kreutzer | Jan. 3, 1933 |
| 1,918,349 | Newton et al. | July 18, 1933 |
| 2,656,662 | Hines | Oct. 27, 1953 |
| 2,669,083 | Hinson | Feb. 16, 1954 |
| 2,794,310 | Galloway | June 4, 1957 |